United States Patent
Wood (10) Patent No.: US 11,546,165 B2
(45) Date of Patent: Jan. 3, 2023

(54) ATTESTATION USING DEVICE-SPECIFIC AND APPLICATION-SPECIFIC ATTESTATION MESSAGES

(71) Applicant: Arm Limited, Cambridge (GB)

(72) Inventor: Nicholas Wood, Belfast (GB)

(73) Assignee: Arm Limited, Cambridge (GB)

( * ) Notice: Subject to any disclaimer, the term of this patent is extended or adjusted under 35 U.S.C. 154(b) by 4 days.

(21) Appl. No.: 16/972,326

(22) PCT Filed: May 24, 2019

(86) PCT No.: PCT/GB2019/051445
§ 371 (c)(1),
(2) Date: Dec. 4, 2020

(87) PCT Pub. No.: WO2019/239101
PCT Pub. Date: Dec. 19, 2019

(65) Prior Publication Data
US 2021/0250176 A1 Aug. 12, 2021

(30) Foreign Application Priority Data
Jun. 11, 2018 (GB) ..................................... 1809521

(51) Int. Cl.
*H04L 9/40* (2022.01)
*H04L 9/32* (2006.01)
(Continued)

(52) U.S. Cl.
CPC .......... *H04L 9/3234* (2013.01); *G06F 21/44* (2013.01); *G06F 21/57* (2013.01); *H04L 9/0861* (2013.01);
(Continued)

(58) Field of Classification Search
CPC .......... G06F 21/44; G06F 21/50; G06F 21/57; G06F 2221/034; H04L 9/3234; H04L 9/0861; H04L 9/3236
See application file for complete search history.

(56) References Cited

U.S. PATENT DOCUMENTS 9,875,368 B1   1/2018 Willden et al.
2008/0077993 A1*  3/2008 Zimmer ................ G06F 21/575
                                                726/27
(Continued)

FOREIGN PATENT DOCUMENTS

TW          201635185         10/2016

OTHER PUBLICATIONS

J. Christopher Bare, "Attestation and Trusted Computing", CSEP 590: Practical Aspects of Modern Cryptography, Mar. 2006, 10 pages.

(Continued)

*Primary Examiner* — Thaddeus J Plecha
(74) *Attorney, Agent, or Firm* — Nixon & Vanderhye P.C.

(57) ABSTRACT

A method comprises: a first data processing device requesting attestation of a second data processing device; the second data processing device generating a device-specific attestation message in dependence upon a device-specific key, a hardware configuration of the second data processing device and a software configuration of software running on the second data processing device; the second data processing device generating an application-specific attestation message in dependence upon an interaction protocol by which the first data processing device and the second data processing device interact; the second data processing device cryptographically binding the application-specific attestation message to the device-specific attestation message; the first data processing device verifying the application-specific attestation message, the verifying step com- (Continued)

prising detecting a trusted status of the application-specific attestation message by verifying the device-specific attestation message cryptographically bound to the application-specific attestation message; and the first data processing device establishing an interaction with the second data processing device according to the interaction protocol, in dependence upon the verified application-specific attestation message.

13 Claims, 6 Drawing Sheets

(51) Int. Cl.
    *G06F 21/44*     (2013.01)
    *G06F 21/57*     (2013.01)
    *H04L 9/08*     (2006.01)

(52) U.S. Cl.
    CPC .......... *H04L 9/3236* (2013.01); *H04L 9/3247* (2013.01); *G06F 2221/034* (2013.01)

(56) References Cited

U.S. PATENT DOCUMENTS

| | | | |
|---|---|---|---|
| 2009/0193509 A1* | 7/2009 | Cardone | H04L 63/0414 |
| | | | 726/9 |
| 2009/0271618 A1 | 10/2009 | Camenisch et al. | |
| 2010/0082984 A1 | 4/2010 | Ellison et al. | |
| 2017/0180076 A1* | 6/2017 | Finlow-Bates | H04L 1/0041 |
| 2017/0346640 A1* | 11/2017 | Smith | H04L 9/14 |
| 2018/0288101 A1* | 10/2018 | Sharma | H04L 9/3297 |
| 2019/0319807 A1* | 10/2019 | Fairfax | H04L 63/0823 |

OTHER PUBLICATIONS

Robert Bedichek, "Some Efficient Architecture Simulation Techniques", Proceedings of the Winter 1990 USENIX Conference, Jan. 22-26, 1990, 12 pages.

"Trusted Platform Module", Wikipedia, last edited on May 15, 2018, 9 pages, https://en.wikipedia.org/w/index.php?title=Trusted_Platform_Module&oldid=841408633.

Sachiko Yoshihama, et al., "WS-Attestation: Efficient and Fine-Grained Remote Attestation on Web Services", 2005 IEEE International Conference on Web Services, IEEE, vol. 2, Jul. 11, 2005, 8 pages.

Combined Search and Examination Report for GB Application No. 1809521.6 dated Jan. 14, 2019, 7 pages.

Examination Report for GB Application No. 1809521.6 dated Oct. 1, 2020, 2 pages.

International Search Report and Written Opinion of the ISA for PCT/GB2019/051445 dated Aug. 22, 2019, 16 pages.

Examination Report for GB Application No. 1809521.6 dated Jan. 11, 2021, 2 pages.

Office Action for IN Application No. 202017056060 dated Sep. 16, 2022, 7 pages.

Office Action for EP Application No. 19727477.2 dated Oct. 6, 2022, 9 pages.

Office Action for TW Application No. 108119291 dated Sep. 13, 2022 and English translation, 27 pages.

* cited by examiner

ATTESTATION USING DEVICE-SPECIFIC AND APPLICATION-SPECIFIC ATTESTATION MESSAGES

This application is the U.S. national phase of International Application No. PCT/GB2019/051445 filed May 24, 2019 which designated the U.S. and claims priority to GB Patent Application No. 1809521.6 filed Jun. 11, 2018, the entire contents of each of which are hereby incorporated by reference.

BACKGROUND

This disclosure relates to data processing.

Attestation is a data processing technique allowing a validating entity (for example, a data processing device) to determine the trustworthiness and/or capabilities of another entity or data processing device it is interacting with. For example, a client device connecting to another device running a particular software service may need to be able to verify that the service has been instantiated correctly and is running in the context of a trusted hardware implementation. Similarly, an IoT (internet of things) service may need to be able to determine the capabilities and/or trustworthiness of an IoT device connecting to it.

In previously proposed implementations of attestation, a dedicated protocol is used requiring integration throughout a system of interacting entities, potentially including dedicated hardware integration. There is currently a large number of such attestation protocols and systems in existence, each tailored to the specific needs of individual systems of interacting entities. These vertically integrated protocols are considered unlikely to be standardised, harmonised, or replaced, and may even represent commercial barriers of entry between competing systems.

As secure systems grow larger and more common, this arrangement can become costly and cumbersome for device vendors to adapt to a changing market place, costly and cumbersome for software vendors as the immutable root of trust is part of device hardware, and hence attestation requires hardware specific porting and implementations of attestation clients, and/or costly and cumbersome for validating entities having to potentially support multiple protocols and interacting systems.

SUMMARY

In an example arrangement there is provided a method comprising:

a first data processing device requesting attestation of a second data processing device;

the second data processing device generating a device-specific attestation message in dependence upon a device-specific key, a hardware configuration of the second data processing device and a software configuration of software running on the second data processing device;

the second data processing device generating an application-specific attestation message in dependence upon an interaction protocol by which the first data processing device and the second data processing device interact;

the second data processing device cryptographically binding the application-specific attestation message to the device-specific attestation message;

the first data processing device verifying the application-specific attestation message, the verifying step comprising detecting a trusted status of the application-specific attestation message by verifying the device-specific attestation message cryptographically bound to the application-specific attestation message; and the first data processing device establishing an interaction with the second data processing device according to the interaction protocol, in dependence upon the verified application-specific attestation message.

In another example arrangement there is provided a data processing device comprising:

circuitry to store a device-specific key;

circuitry to generate, in response to a request for attestation by a second data processing device, a device-specific attestation message in dependence upon the device-specific key, a hardware configuration of the data processing device and a software configuration of software running on the data processing device;

circuitry to generate an application-specific attestation message in dependence upon an interaction protocol by which the data processing device and the second data processing device interact;

circuitry to cryptographically bind the application-specific attestation message to the device-specific attestation message.

In another example arrangement there is provided a data processing device comprising:

circuitry to request attestation of a second data processing device and to receive from the second data processing device a device-specific attestation message in dependence upon a device-specific key, a hardware configuration of the second data processing device and a software configuration of software running on the second data processing device, cryptographically bound to an application-specific attestation message in dependence upon an interaction protocol by which the data processing device and the second data processing device interact;

circuitry to verify the application-specific attestation message, the verifying comprising detecting a trusted status of the application-specific attestation message by verifying the device-specific attestation message cryptographically bound to the application-specific attestation message; and circuitry to establish an interaction with the second data processing device according to the interaction protocol, in dependence upon the verified application-specific attestation message.

In another example arrangement there is provided a data processing system comprising: the data processing devices defined above, configured to interact with one another using the interaction protocol.

In another example arrangement there is provided a method of operation of a data processing device, the method comprising:

storing a device-specific key;

generating, in response to a request for attestation by a second data processing device, a device-specific attestation message in dependence upon the device-specific key, a hardware configuration of the data processing device and a software configuration of software running on the data processing device;

generating an application-specific attestation message in dependence upon an interaction protocol by which the data processing device and the second data processing device interact;

cryptographically binding the application-specific attestation message to the device-specific attestation message.

In another example arrangement there is provided a method of operation of a data processing device, the method comprising:

requesting attestation of a second data processing device and to receive from the second data processing device a device-specific attestation message in dependence upon a device-specific key, a hardware configuration of the second data processing device and a software configuration of software running on the second data processing device, cryptographically bound to an application-specific attestation message in dependence upon an interaction protocol by which the data processing device and the second data processing device interact;

verifying the application-specific attestation message, the verifying comprising detecting a trusted status of the application-specific attestation message by verifying the device-specific attestation message cryptographically bound to the application-specific attestation message; and establishing an interaction with the second data processing device according to the interaction protocol, in dependence upon the verified application-specific attestation message.

In another example arrangement there is provided a computer program for controlling a host data processing apparatus to provide an instruction execution environment comprising: computer program logic to store a device-specific key; computer program logic to generate, in response to a request for attestation by a second data processing device, a device-specific attestation message in dependence upon the device-specific key, a hardware configuration of the data processing device and a software configuration of software running on the data processing device; computer program logic to generate an application-specific attestation message in dependence upon an interaction protocol by which the data processing device and the second data processing device interact; and computer program logic to cryptographically bind the application-specific attestation message to the device-specific attestation message.

In another example arrangement there is provided a computer program for controlling a host data processing apparatus to provide an instruction execution environment comprising:

computer program logic to request attestation of a second data processing device and to receive from the second data processing device a device-specific attestation message in dependence upon a device-specific key, a hardware configuration of the second data processing device and a software configuration of software running on the second data processing device, cryptographically bound to an application-specific attestation message in dependence upon an interaction protocol by which the data processing device and the second data processing device interact;

computer program logic to verify the application-specific attestation message, the verifying comprising detecting a trusted status of the application-specific attestation message by verifying the device-specific attestation message cryptographically bound to the application-specific attestation message; and computer program logic to establish an interaction with the second data processing device according to the interaction protocol, in dependence upon the verified application-specific attestation message.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
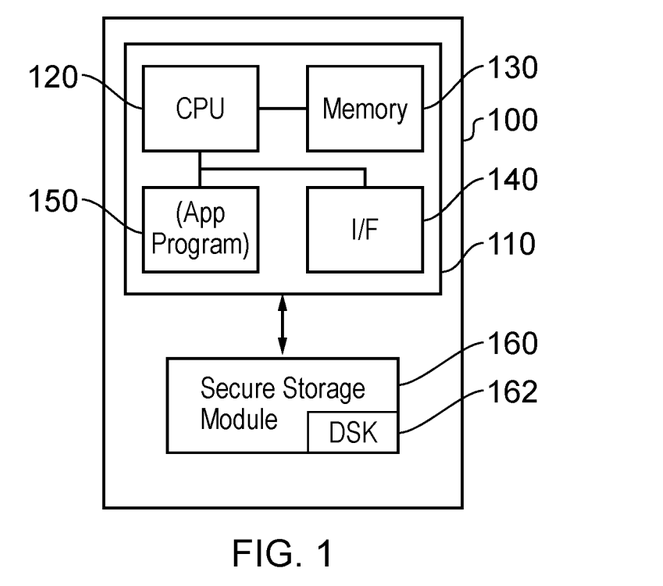
FIG. 1 schematically illustrates a data processing device.

Referring now to the drawings, FIG. 1 schematically illustrates a data processing device 100 suitable for use as a device capable of responding to an attestation request, comprising application program execution circuitry 110 having a processing element or central processing unit (CPU) 120, a memory 130 such as a random access memory (RAM), an interface 140 and storage (such as a non-volatile machine-readable memory such as a flash memory) 150 for one or more application programs. The apparatus also comprises a secure storage module 160 in data communication with the application execution circuitry 110.

The secure storage module 160 may be implemented as temper-resistant memory accessible under all circumstances by the circuitry 110. In other examples the term "tamper resistance" refers to the memory being hardened or secured against alterations made after manufacture of the device 100 and/or to accesses made other than by the circuitry 110 or permitted applications executing on the circuitry 110.

In other examples, the secure storage module 160 may be a so-called Trusted Platform Module (TPM) which again represents a tamper-resistant piece of cryptographic hardware built into the device 100 that, as well as storing one or more keys as discussed below, can also implement at least some cryptographic functions on the basis of which a set of cryptographic operations can be constructed. A description of TPMs is provided at the following link: https://en.wikipedia.org/wiki/Trusted_Platform_Module, which document is incorporated in this description by reference. In some examples, the TPM, as an example of the secure storage module 160, may have capabilities of performing public key cryptographic operations, computing hash functions, securely storing keys and other secret data, along with potentially generating random numbers and performing attestation functions to be discussed below. In this context, a hash function is a mathematical function used to map an input data space to a generally smaller output data space. In the context of cryptography, hash functions are generally established to render it difficult to select another input value which leads to the same output hash value.

So, as part of the functionality of the secure storage module 160, at least a so-called device-specific key (DSK) or implementation key 162 is securely stored. This is provided and stored at manufacture of the device 100 and is provided according to a method to be described below with reference to FIG. 2.

Therefore, using techniques to be described further below, the device 100 can provide an example of a data processing device comprising: circuitry 160 to store a device-specific key; and circuitry 110/160 to generate, in response to a request for attestation by a second data processing device, a device-specific attestation message in dependence upon the device-specific key, a hardware configuration of the data processing device and a software configuration of software running on the data processing device, to generate an application-specific attestation message in dependence upon an interaction protocol by which the data processing device and the second data processing device interact and to cryptographically bind the application-specific attestation message to the device-specific attestation message.

Figure 2:
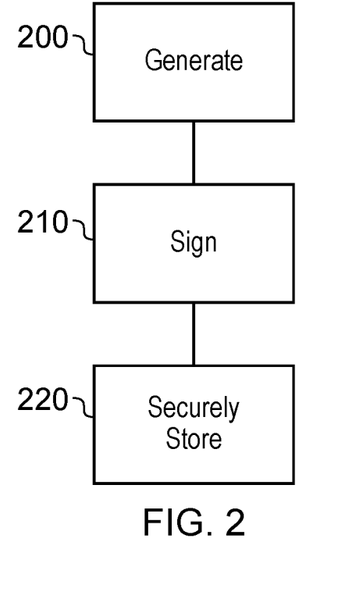
FIG. 2 is a schematic flowchart illustrating at least a part of a method of manufacture of the device of FIG. 1.

Referring to FIG. 2, at a step 200, a verification apparatus, for example provided by a verification service, generates the device-specific key 162. This is unique to the device 100, or at least unique within a family of devices including the device 100 (so that for any particular instance of the device 100, the DSK 162 is unique at least as regards any other instance of the device 100). At a step 210, the verification service, for example using the verification apparatus, cryptographically signs the device-specific key. At a step 220, the device-specific key 162 is stored in the secure storage module as part of manufacture of the device 100.

Figure 3:
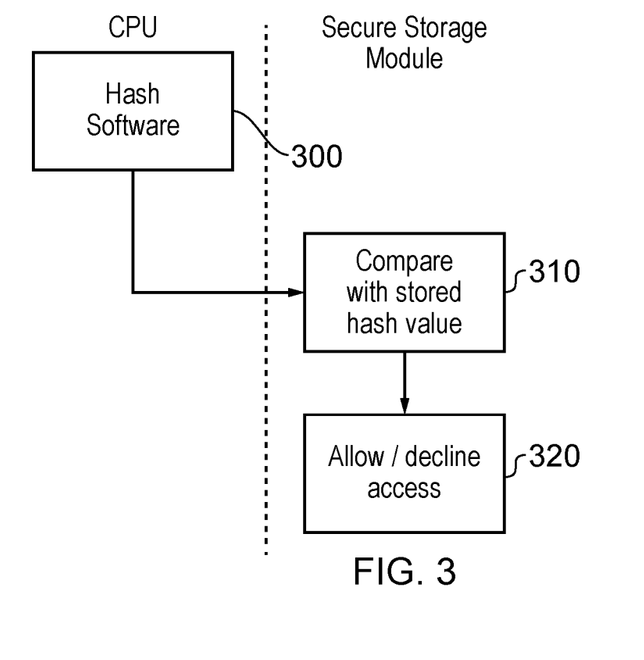
FIG. 3 schematically illustrates the operation of a secure storage module.

FIG. 3 is a schematic flow chart illustrating an example technique for controlling access to the device-specific key held by the secure storage module. This provides an example in which the second data processing device (the device 100) securely stores a device-specific key and in which the step of generating the device-specific attestation message comprises attestation client software of the second data processing apparatus accessing the securely stored device-specific key.

In at least some examples, when access to the device-specific key is requested by an application program at the circuitry 110, the CPU 120 or a hash function generator of the secure storage module 160 generates a hash value from the computer software forming the application program at a step 300 this is passed to the secure storage module which then compares the generated hash value with a stored hash value of an allowable application program which should be permitted to access the device-specific key. At a step 320, the secure storage module allows or declines access to the device-specific key in dependence upon whether the hash value provided by the CPU at the step 300 is the same as a stored hash value is detected at the step 310.

Therefore, this provides an example of an accessing step comparing a hash value dependent upon the client software attempting to access the device-specific key with a set of one or more hash values indicating that access to the securely stored device-specific key is allowed.

In these or other examples, the arrangement as described can inhibit or restrict access to the device-specific key other than by indirect access using device-specific attestation software (for example, running as an example of the application program code 150). Such software could use a secret hashing or encryption algorithm or the like to provide access to the device-specific key, or could test for the presence of certain device-specific hardware and/or software features in order to allow such access.

Figure 4:
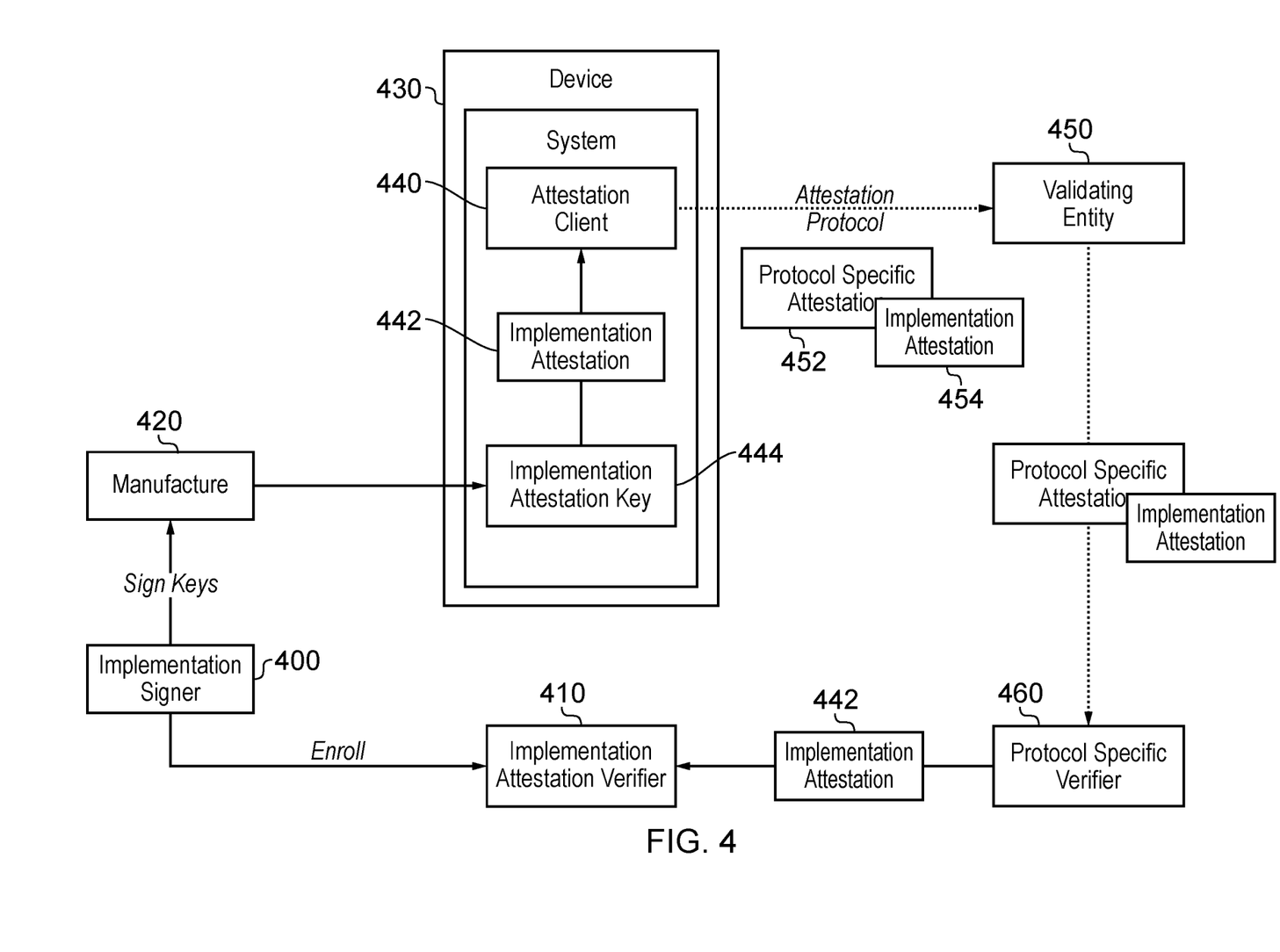
FIG. 4 provides a schematic overview of the operation of embodiments of the disclosure.

An overview of the present embodiment is provided by FIG. 4. Here, the attestation process is considered separately (or partitioned) as between the attestation of device-specific aspects such as a hardware configuration of the device to be attested and the software configuration of software running on that device, separately from protocol-specific attestation relating to application-specific considerations upon which an interaction protocol by which the data processing devices (the device requesting attestation and the device to be attested) will communicate.

Examples of application-specific attestation parameters can include the following;
  Attestation protocols related parameters for the interaction of the device 100 with other devices
  Application specific state, such as if a device has been commissioned with a service
Examples of device-specific attestation parameters can include the following:
  manufacturer
  root of trust
  hardware implementation
  device specific state, such as whether the device 100 is in a debug state
  completion of initial boot process
  software versions) running on the device 100 and verified by the initial boot process Referring to FIG. 4, the device-specific key 162 is referred to as the implementation key or implementation attestation key in the drawing. An implementation signer 400 issues an implementation key at device manufacture. The implementation signer is associated with an implementation verifier 410. The signed implementation key identifies (or can be used to verify an assertion of) the device specific aspects of the implementation of the device 430 (such as a device 100 of FIG. 1) and is installed in the secure storage of the device 430 at manufacture 420. The device 430 has a protocol-specific (application-specific) attestation client application 440 which obtains a signed attestation 442 from or using the secure storage 444 of the device 430.

The attestation process can take various forms. For example, to generate the device-specific attestation message, the secure storage module 160 can be provided with (at manufacture) data indicating hardware features of the device 100, which can be provided in the form of a message signed(for example, using functionality of the secure storage module 160) by the device-specific key 162.

The application-specific attestation message can for example be generated as follows. The application program running on the application program execution circuitry 110 generates a public/private key pair, used to sign application specific messages. The secure storage module signs a hash of the public key with the DSK 162, creating a cryptographic binding The attestation client 440 implements an attestation protocol with a validating entity 450 such as another data processing device (an example of which will be described below with reference to FIG. 7). The attestation client controls the cryptographic binding of any protocol specific attestation information 452 to the implementation attestation 454. The binding operation will be discussed further below with reference to FIG. 6. This therefore links the protocol specific attestation information with the root of trust represented by the implementation attestation key 444 without requiring protocol-specific hardware provisioning at the device 430.

The validating entity 450 verifies the protocol specific attestation with a protocol specific verifier 460 which in turn interacts with the implementation verifier 410 to verify the implementation attestation 442 which was used to cryptographically sign the protocol specific attestation.

Figure 5:
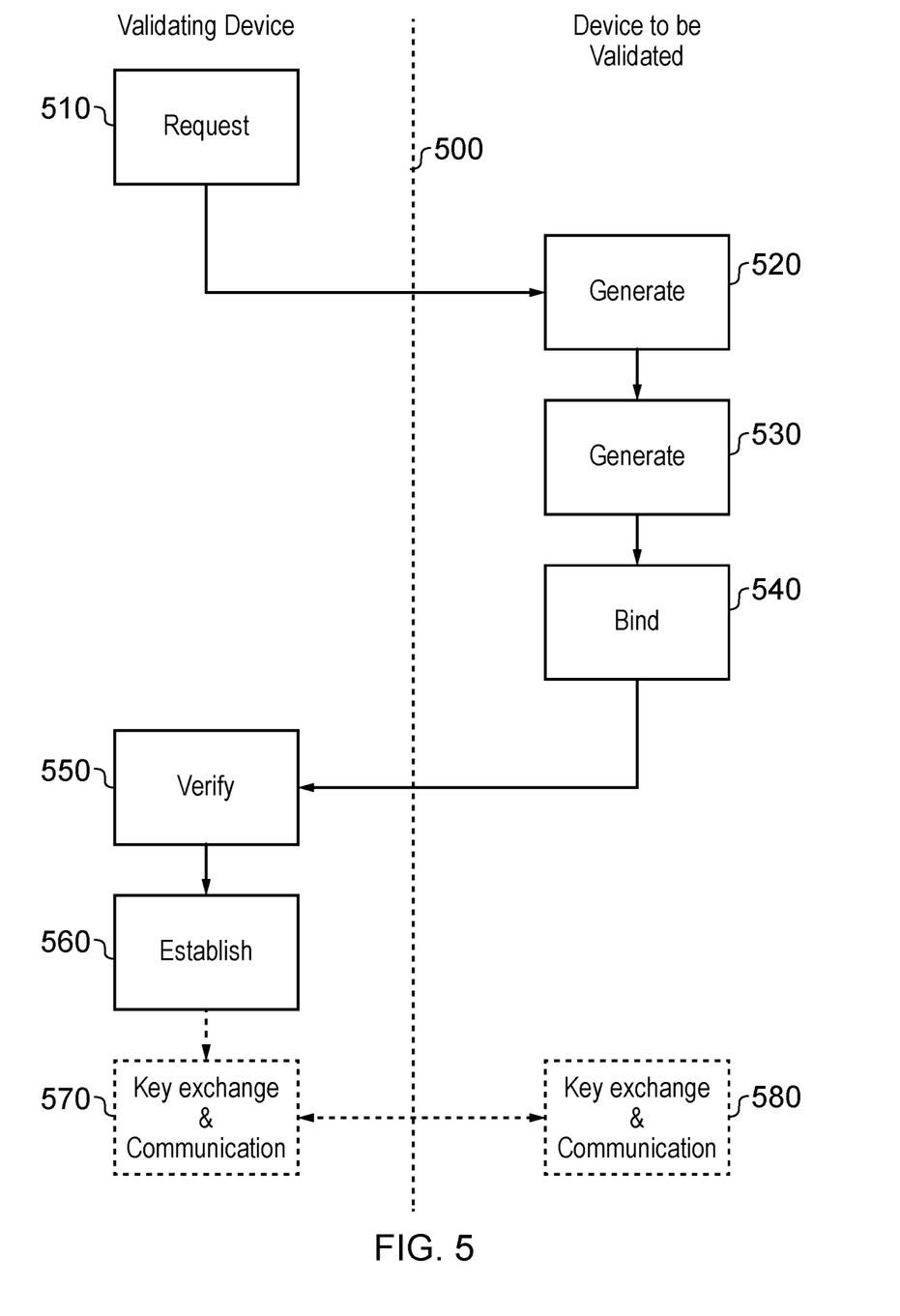
FIG. 5 is a schematic flowchart illustrating a method.

FIG. 5 is a schematic flowchart illustrating a method. In FIG. 5, operations by a validating device (referred to as a first data processing device) are shown to the left of a dashed line 500, and operations by a device to be validated (referred to as a second data processing device) are shown to the right of the broken line 500. The method comprises the following steps.

At a step 510, the first data processing device (the validating entity 450 in FIG. 4) requests attestation of or by the second data processing device.

At a step 520, the second data processing device (the device 430 in FIG. 4) generates a device-specific attestation message 454 in dependence upon a device-specific key, a hardware configuration of the second data processing device and a software configuration of software running on the second data processing device.

At a step 530, the second data processing device generates an application-specific attestation message 454 in dependence upon an interaction protocol by which the first data processing device and the second data processing device interact.

At a step 540, the second data processing device cryptographically binds the application-specific attestation message 454 to the device-specific attestation message 452.

Note that in some example embodiments, the step 540 can involve signing the messages generated at both steps 520 and 530 together, creating the cryptographic binding.

At a step 550, the first data processing device verifies the application-specific attestation message, the verifying step comprising detecting a trusted status of the application-specific attestation message by verifying the device-specific attestation message cryptographically bound to the application-specific attestation message.

The steps 200 (FIG. 2) and 550 (FIG. 5) can concern interaction with the same entity, in that they can provide an example of a verification apparatus generating the device-specific key for storage by the second data processing device; and an example of a verifying step comprises the first data processing device requesting verification of the device-specific attestation message by the verification apparatus.

At a step 560, the first data processing device establishes an interaction with the second data processing device according to the interaction protocol, in dependence upon the verified application-specific attestation message.

As shown schematically by the steps 570, 580, the establishing of the interaction can involve the first and second data processing devices exchanging one or more session keys (for example, by a so-called Diffie-Hellman key exchange technique for encrypted communication between the first and second data processing devices, and carrying out communication using the session keys.

Figure 6:
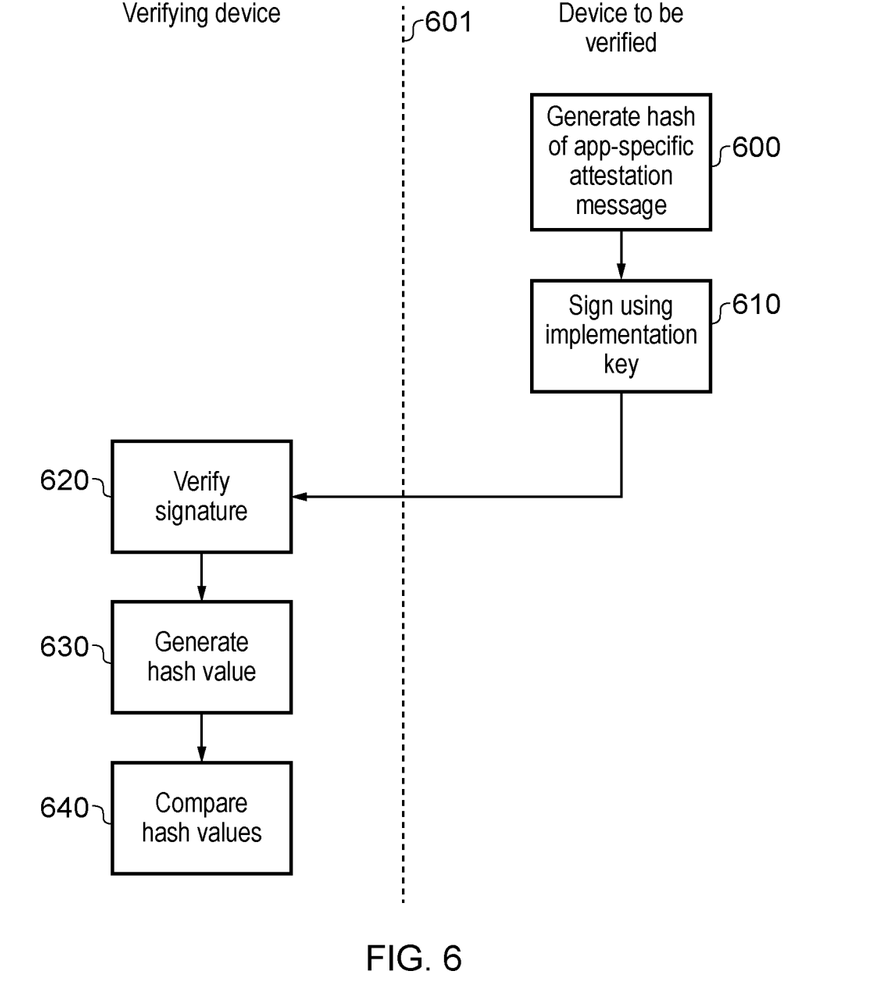
FIG. 6 is a schematic flowchart illustrating an example cryptographic binding technique.

FIG. 6 schematically illustrates the process of cryptographic binding of the device specific attestation message and the application specific attestation message. Steps to the left of a broken line 601 are carried out by the verifying device and steps to the right of the broken line 601 are carried out by the device to be verified.

Generally speaking, cryptographic binding provides a technique for demonstrating data integrity and authenticity using cryptographic operations. In some examples, the technique can operate by generating a hash value of each data object and digitally signing the collection of one or more hash values. When the data is subsequently accessed, the signature can be verified and any discrepancy in hash values can be used to detect which data object has been modified since the binding operation took place.

At a step 600, the device to be verified generates a hash of the application specific attestation message and at a step 610 cryptographically signs the generated hash using the implementation key or device-specific key.

At a step 620, the verifying device verifies the signature, potentially with reference to the verifier 410. The verifying device generates a corresponding hash value using the same hash algorithm at a step 630 and compares the just-generated hash value with the signed hash value at a step 640. If the two match then the application-specific attestation message can be trusted.

Note that as discussed above, in some other example embodiments, this process may effectively be performed at the same time as generating the device specific attestation, to prove that the signed binding and device specific attestation go together. In other words, in some examples the step 540 can involve signing both 520 and 530 together, creating the binding.

Figure 7:
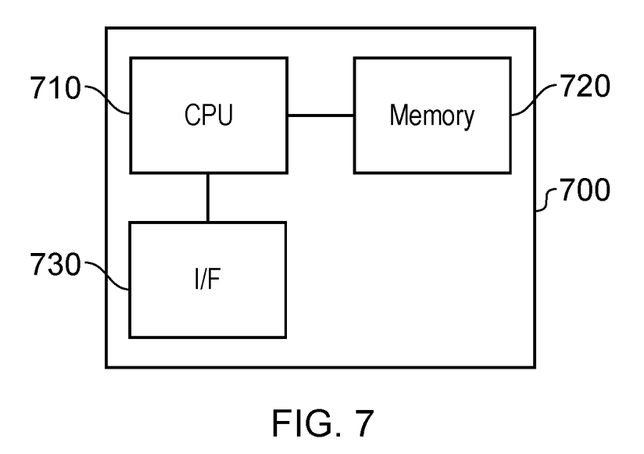
FIG. 7 schematically illustrates another data processing device.

FIG. 7 schematically illustrates a verification requesting data processing device 700 comprising a processing element such as a central processing unit or CPU 710, one or more memories 720 including for example a RAM and storage (such as a non-volatile machine-readable memory such as a flash memory) for one or more application programs, and an interface 730.

FIG. 7 therefore provides an example of a data processing device comprising: circuitry to request attestation of a second data processing device and to receive from the second data processing device a device-specific attestation message in dependence upon a device-specific key, a hardware configuration of the second data processing device and a software configuration of software running on the second data processing device, cryptographically bound to an application-specific attestation message in dependence upon an interaction protocol by which the data processing device and the second data processing device interact; circuitry to verify the application-specific attestation message, the verifying comprising detecting a trusted status of the application-specific attestation message by verifying the device-specific attestation message cryptographically bound to the application-specific attestation message; and circuitry to establish an interaction with the second data processing device according to the interaction protocol, in dependence upon the verified application-specific attestation message. These functions can be performed by the CPU 710 under the control of computer software stored by the memory 720.

The interactions shown in FIG. 5 can take place in the context of a data processing system comprising a data processing device 100 of FIG. 1 configured to interact with a data processing device 700 of FIG. 7, using the established interaction protocol.

Figure 8:
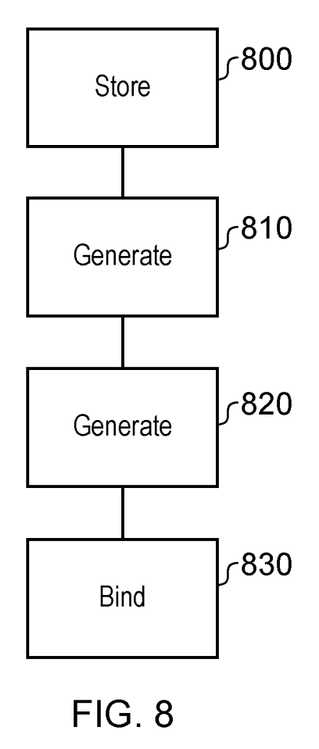
FIGS. 8 and 9 are schematic flowchart illustrating respective methods.

FIG. 8 is a schematic flowchart illustrating a method of operation of a data processing device (such as a device to be validated, for example the device of FIG. 1), the method comprising:

storing (at a step 800) a device-specific key;

generating (at a step 810), in response to a request for attestation by a second data processing device, a device-specific attestation message in dependence upon the device-specific key, a hardware configuration of the data processing device and a software configuration of software running on the data processing device;

generating (at a step 820) an application-specific attestation message in dependence upon an interaction protocol by which the data processing device and the second data processing device interact; and cryptographically binding (at a step 830) the application-specific attestation message to the device-specific attestation message, for example, for sending to a validation requesting device.

Figure 9:
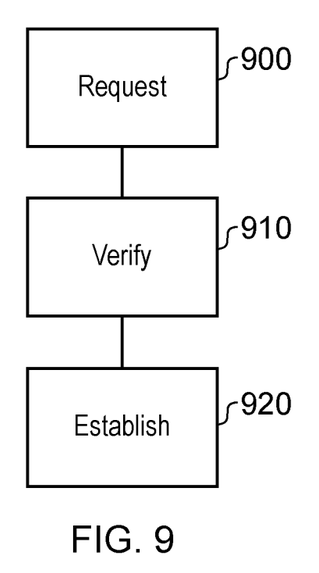

FIG. 9 is a schematic flowchart illustrating a method of operation of a data processing device (such as a validation requesting device, for example the device of FIG. 7), the method comprising:

requesting (at a step 900) attestation of a second data processing device and to receive from the second data processing device a device-specific attestation message in dependence upon a device-specific key, a hardware configuration of the second data processing device and a software configuration of software running on the second data processing device, cryptographically bound to an application-specific attestation message in dependence upon an interaction protocol by which the data processing device and the second data processing device interact;

verifying (at a step 910) the application-specific attestation message, the verifying comprising detecting a trusted status of the application-specific attestation message by verifying the device-specific attestation message cryptographically bound to the application-specific attestation message; and establishing (at a step 920) an interaction with the second data processing device according to the interaction protocol, in dependence upon the verified application-specific attestation message.

Figure 10:
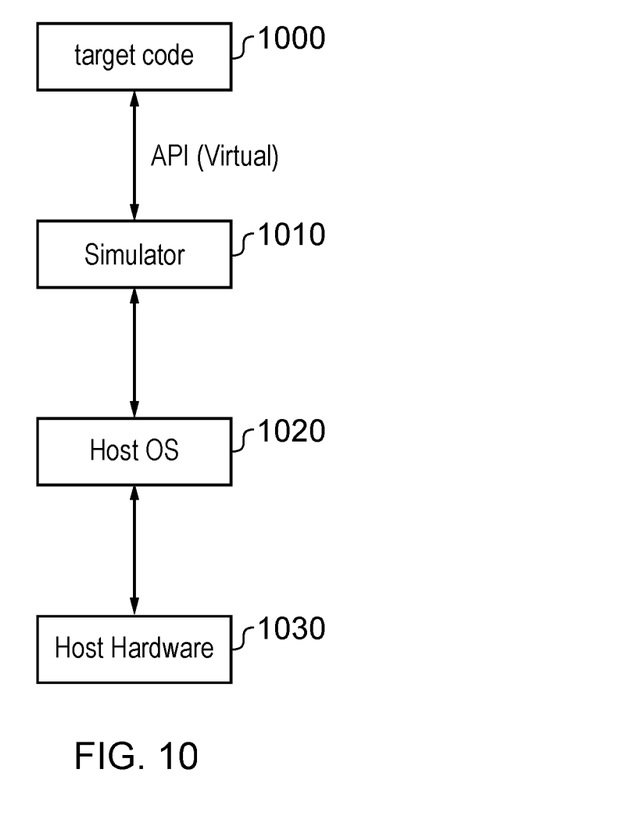
FIG. 10 schematically illustrates a simulator implementation.

FIG. 10 schematically illustrates a simulator implementation that may be used. Whilst the earlier described embodiments implement the present disclosure in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1030, optionally running a host operating system 1020, supporting the simulator program 1010. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63, the contents of which are hereby incorporated by reference.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1030), some simulated embodiments may make use of the host hardware, where suitable.

The simulator program 1010 may be stored on a computer-readable or machine-readable storage medium (which may be a non-transitory medium), and provides a program interface (instruction execution environment) to the target code 1000 (which may include applications, operating systems and a hypervisor) which is the same as the application program interface of the hardware architecture being modelled by the simulator program 1010. Thus, the program instructions of the target code 1000, including instructions to perform one or more of the methods described above, may be executed from within the instruction execution environment using the simulator program 1010, so that a host computer 1030 which does not actually have the hardware features of the apparatus of FIGS. 1 and/or 7 discussed above can emulate these features.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A method comprising:
a first data processing device requesting attestation of a second data processing device;
the second data processing device generating a device-specific attestation message in dependence upon a hardware configuration of the second data processing device and a software configuration of software running on the second data processing device, the device-specific attestation message signed using a device-specific key;
the second data processing device generating an application-specific attestation message in dependence upon an interaction protocol by which the first data processing device and the second data processing device interact;
the second data processing device cryptographically binding the application-specific attestation message to the device-specific attestation message;
the first data processing device verifying the application-specific attestation message, the verifying step comprising detecting a trusted status of the application-specific attestation message by verifying the device-specific attestation message cryptographically bound to the application-specific attestation message; and the first data processing device establishing an interaction with the second data processing device according to the interaction protocol, in dependence upon the verified application-specific attestation message.

2. A method according to claim 1, comprising the step of: the second data processing device securely storing the device-specific key;

and in which the step of generating the device-specific attestation message comprises attestation client software of the second data processing apparatus accessing the securely stored device-specific key.

3. A method according to claim 2, comprising inhibiting access to the device-specific key other than by indirect access using device-specific attestation software.

4. A method according to claim 2, in which the accessing step comprises comparing a hash dependent upon the attestation client software with a set of one or more hash values indicating that access to the securely stored device-specific key is allowed.

5. A method according to claim 1, in which the establishing step comprises the first and second data processing devices exchanging one or more session keys for encrypted communication between the first and second data processing devices.

6. A method according to claim 1, comprising the step of: a verification apparatus generating the device-specific key for storage by the second data processing device;

and in which the verifying step comprises the first data processing device requesting verification of the device-specific attestation message by the verification apparatus.

7. A non-transitory machine-readable storage medium which stores computer software which, when executed by one or more processors, causes the one or more processors to perform a method according to claim 1.

8. A data processing device comprising:
circuitry to store a device-specific key;
circuitry to generate, in response to a request for attestation by a second data processing device, a device-specific attestation message in dependence upon a hardware configuration of the data processing device and a software configuration of software running on the data processing device, the device-specific attestation message signed using the device-specific key;
circuitry to generate an application-specific attestation message in dependence upon an interaction protocol by which the data processing device and the second data processing device interact;
circuitry to cryptographically bind the application-specific attestation message to the device-specific attestation message.

9. A data processing device comprising:
circuitry to request attestation of a second data processing device and to receive from the second data processing device a device-specific attestation message in dependence upon a hardware configuration of the second data processing device and a software configuration of software running on the second data processing device, the device-specific attestation message signed using a device-specific key and cryptographically bound to an application-specific attestation message in dependence upon an interaction protocol by which the data processing device and the second data processing device interact;
circuitry to verify the application-specific attestation message, the verifying comprising detecting a trusted status of the application-specific attestation message by verifying the device-specific attestation message cryptographically bound to the application-specific attestation message; and
circuitry to establish an interaction with the second data processing device according to the interaction protocol, in dependence upon the verified application-specific attestation message.

10. A method of operation of a data processing device, the method comprising:
storing a device-specific key;
generating, in response to a request for attestation by a second data processing device, a device-specific attestation message in dependence upon a hardware configuration of the data processing device and a software configuration of software running on the data processing device, the device-specific attestation message signed using the device-specific key;
generating an application-specific attestation message in dependence upon an interaction protocol by which the data processing device and the second data processing device interact;
cryptographically binding the application-specific attestation message to the device-specific attestation message.

11. A non-transitory machine-readable storage medium which stores computer software which, when executed by one or more processors, causes the one or more processors to perform a method according to claim 10.

12. A method of operation of a data processing device, the method comprising:
requesting attestation of a second data processing device and to receive from the second data processing device a device-specific attestation message in dependence upon a hardware configuration of the second data processing device and a software configuration of software running on the second data processing device, the device-specific attestation message signed using a device-specific key and cryptographically bound to an application-specific attestation message in dependence upon an interaction protocol by which the data processing device and the second data processing device interact;
verifying the application-specific attestation message, the verifying comprising detecting a trusted status of the application-specific attestation message by verifying the device-specific attestation message cryptographically bound to the application-specific attestation message; and
establishing an interaction with the second data processing device according to the interaction protocol, in dependence upon the verified application-specific attestation message.

13. A non-transitory machine-readable storage medium which stores computer software which, when executed by one or more processors, causes the one or more processors to perform a method according to claim 12.

* * * * *